(12) United States Patent
Dezoete

(10) Patent No.: US 8,572,923 B2
(45) Date of Patent: Nov. 5, 2013

(54) REMOVABLE MID-SECTION PRODUCTION FLOORBOARD

(75) Inventor: Steven Dezoete, Summerville, SC (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 13/153,661

(22) Filed: Jun. 6, 2011

(65) Prior Publication Data

US 2012/0304579 A1 Dec. 6, 2012

(51) Int. Cl.
 *E04B 2/00* (2006.01)

(52) U.S. Cl.
 USPC .......................................... 52/582.2; 244/120

(58) Field of Classification Search
 USPC ......... 52/578, 582.2, 263, 480; 292/194, 195, 292/202; 244/118.2, 120
 See application file for complete search history.

(56) References Cited

U.S. PATENT DOCUMENTS

| | | | |
|---|---|---|---|
| 3,253,289 A * | 5/1966 | Nagin ............................... | 14/73 |
| 4,676,036 A | 6/1987 | Bessert | |
| 4,843,792 A * | 7/1989 | Rogers et al. ................. | 52/127.7 |
| 4,845,915 A * | 7/1989 | Rogers et al. ................. | 52/782.1 |
| 5,953,878 A * | 9/1999 | Johnson ........................ | 52/582.2 |
| 7,546,715 B2 | 6/2009 | Roen | |
| 8,091,302 B2 * | 1/2012 | Meyer ............................. | 52/263 |
| 2003/0057326 A1 * | 3/2003 | Medina et al. .............. | 244/137.1 |
| 2008/0072515 A1 * | 3/2008 | Huhnerbein .................. | 52/582.2 |
| 2010/0257796 A1 * | 10/2010 | Bertke et al. .................... | 52/263 |
| 2010/0275535 A1 | 11/2010 | Gard et al. | |
| 2011/0016809 A1 * | 1/2011 | Knight et al. ................... | 52/263 |
| 2012/0000020 A1 * | 1/2012 | Newton ............................. | 14/73 |
| 2012/0036807 A1 * | 2/2012 | Pacione et al. .................. | 52/578 |
| 2012/0131862 A1 | 5/2012 | Hashimoto et al. | |

FOREIGN PATENT DOCUMENTS

| | | |
|---|---|---|
| JP | 2011-0032750 A | 2/2011 |
| WO | WO 2006/042564 | 4/2006 |

OTHER PUBLICATIONS

Nida-Core Corp., "Laminated Panels—Thermoplastic" www.nida-core.com/english/nidaprod_lamin_thermoplastic.htm accessed Jun. 6, 2011.
European Search Report from European Application No. 121701101.5 dated Jul. 12, 2013.

* cited by examiner

*Primary Examiner* — Brian Glessner
*Assistant Examiner* — Paola Agudelo
(74) *Attorney, Agent, or Firm* — Hope Baldauff, LLC

(57) ABSTRACT

A removable flooring system includes modular floorboard panels having one or more latches, placed on longitudinal support structures having mating locking disks, so that the floorboard panels can be readily secured to the longitudinal support structure. In one embodiment, the floorboard panel comprises a top skin, a frame, and a bottom skin. Two latches may be located in the panel, where each latches comprise a latch handle, a moveable cam, and a board disk. The locking disk is affixed to the longitudinal support structure, and is designed to receive the board disk. The latch can be rotated so the cam readily engages and disengages with the locking disk. To use the system, a plurality of longitudinal support structures are placed in a plane, and a plurality of floorboard panels are placed over the longitudinal support structure, and affixed by rotating the cam in the latch.

16 Claims, 9 Drawing Sheets

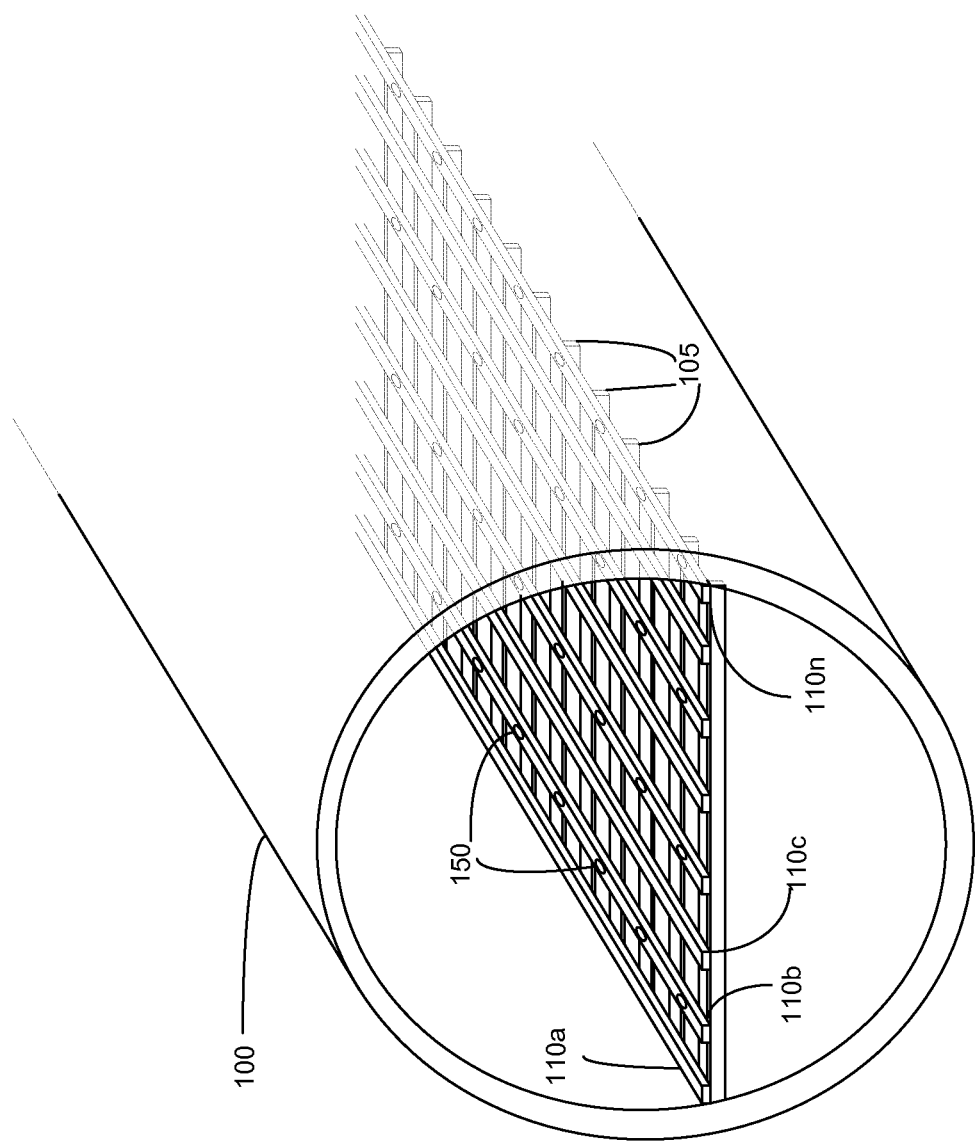

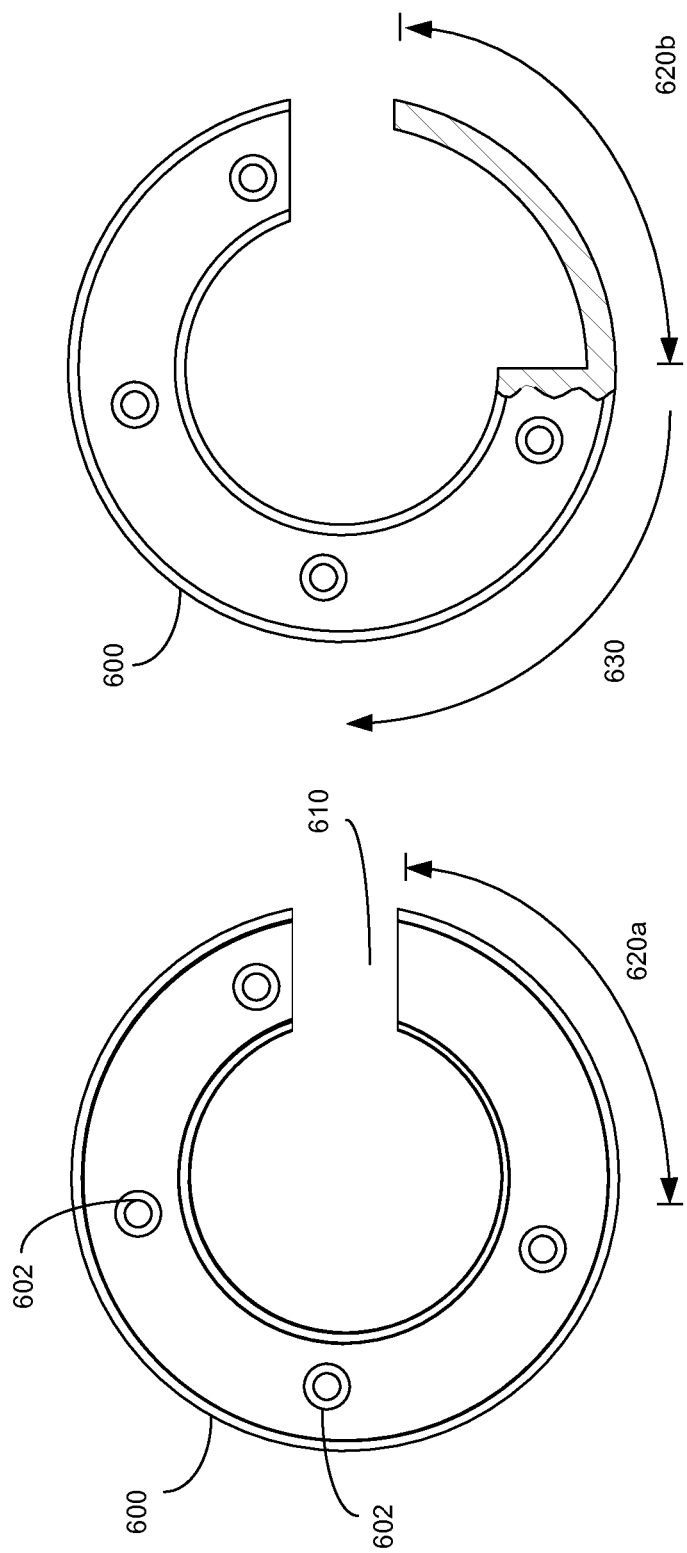

REMOVABLE MID-SECTION PRODUCTION FLOORBOARD

BACKGROUND

Manufacturing an aircraft is a complex process, largely involving manual tasks in assembling the aircraft. Commercial aircraft, for example, can be very large in size, and are typically manufactured in sections. Specifically, the fuselage portion for large commercial aircraft can comprise sections that are individually assembled and then combined. During assembly, different hydraulic, electrical, and other components are installed by workers in the individual sections and then in the combined sections of the fuselage. During manufacturing, it can be difficult for workers to physically access the necessary portions of the interior portions of the airframe, shell, or other area of the fuselage. Standing, let alone walking, directly on the interior of the airframe structure can be unsafe, and can potentially cause damage to installed components.

One approach for facilitating worker access during manufacturing of the fuselage is to provide a removable flooring system within the fuselage, upon which the workers can walk and stand upon when working on the interior of the fuselage. This flooring system comprises various sections called floorboards that are typically modular. These are placed on structural members, and allow workers to stand and walk about so as to complete their respective manufacturing tasks.

Some floorboard systems comprise floorboard panels which interlock, or that have integrated fasteners at each edge for affixing the floorboard panel with an adjacent floorboard panel. Incorporating one or two fasteners on each side increases cost and complexity of each panel, and further increases the time to install or remove a panel. Such floorboard panels may be relatively heavy, requiring two workers to safely install or remove a panel. Other floorboard panels are fastened to adjacent floorboard panels using plastic zip ties which loop through holes in the panel that also serve as handles for carrying the panel, but these floorboard panels are not secured to the support structure and may tip, thereby creating a hazard.

The floorboard system should promote safety, low cost, and ease of installation and removal, since one application is used as a temporary flooring structure that is only present during manufacturing. The floorboards should be able to be secured, so that they do not move, tilt, flex, or otherwise present an unsafe condition as workers walk about. An individual floorboard panel should also be easily removable, so that access to the area underneath a floorboard can be readily accessed. The system should provide a relatively flat surface, free of protrusions, so as to minimize tripping or other accidents. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment of the disclosure, a panel suitable for supporting the weight of a person is provided. The panel may include a plurality of latches. Further, each latch on the panel maybe flush mounted with respect to a top surface of the panel, and includes a rotary operated cam configured to attach the floorboard panel to a longitudinal structural support.

In another embodiment of the disclosure, a removable flooring system with readily attachable floorboard panels is provided. The system includes two or more longitudinal support structures, wherein each longitudinal support structure includes a circular locking disk affixed to the longitudinal support structure. The system also includes one or more attachable floorboard panels, wherein each floorboard panel may be a rectangular shaped panel having a length and a width, where the length is nominally twice the width. Each floorboard panel may have two latches configured to mate with the locking disk. Each latch can be a flush mounted rotary cam latch. Typically, each latch is positioned along the center line of the floorboard panel, wherein the center line runs parallel to the length of the floorboard panel.

In another embodiment of the disclosure, a method is disclosed for providing a removable flooring system in a workspace. The method includes the operations of placing two or more longitudinal support structures in a parallel manner in the workspace. Each longitudinal support structure may have a plurality of locking disks attached to the surface. The method includes placing a removable floorboard panel having a length and a width on two or more of the longitudinal support structures. The floorboard panel has one or more flush mounted rotary cam latch assemblies along a center line of the panel, such that each latch assembly is placed over a corresponding locking disk. A latch and cam in the latch assembly is rotated to affix the cam with the locking disk.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 1A illustrates one embodiment of a removable floorboard structural system in a mid-section of an aircraft for use with removable floorboard panels.

FIGS. 6A-6B illustrate views of a locking disk used in conjunction with the floorboard panel according to various embodiments.

DETAILED DESCRIPTION

Figure 1B:
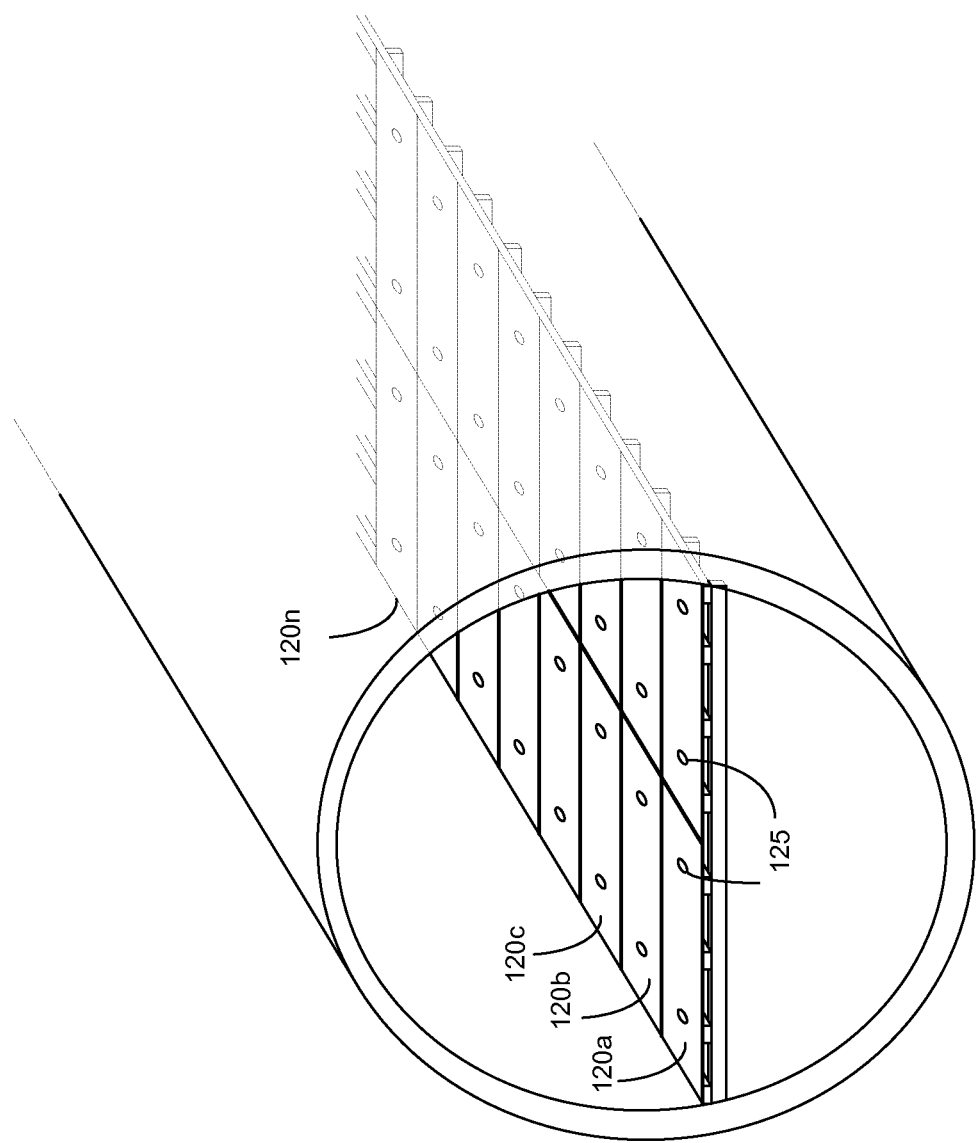
FIG. 1B illustrates one embodiment of a removable floorboard system in a mid-section of an aircraft with installed floorboard panels.

The following detailed description is directed to systems and methods involving a removable floorboard system used in various work space environments, including a production environment. Although various embodiments are described in the context of assembling an aircraft, it should be recognized that applications of the disclosure are not limited to assembling an aircraft, nor limited to an aviation context. The removable floorboard system described herein can be used as a temporary flooring system for the construction or renovation of buildings, installation or repair of industrial equipment, or wherever removable walkways are required, including, but not limited to, applications in the construction industry, theatrical applications, or manufacturing of other types of large equipment. Further, the removable flooring system can be used as an in-service flooring system (e.g., for regular use) in many of these same workspace applications.

In the following detailed description, references are made to the accompanying drawings by way of illustrating various embodiments of the disclosure. In the drawings, like numerals represent like elements.

Turning to FIG. 1A, one application of the removable flooring system is shown in the context of manufacturing a large passenger airplane. Typically, the fuselage 100 is constructed in sections, and each section can be quite large in diameter. For commercial aircraft, the diameter can often exceed eight to ten feet, such that if a worker was standing in the bottom interior of the fuselage section itself, they could not reach other areas of the fuselage to perform their work. A temporary flooring structure installed in the fuselage allows workers to easily walk, stand, and access portions of the fuselage as necessary.

The fuselage may incorporate permanent (or temporary) crossbar support structures periodically positioned perpendicular to the fuselage. These are shown as crossbar support structures 105 in FIG. 1A. In some embodiments, these crossbar support structures 105 may be temporarily installed solely for the purpose of supporting the flooring system. In the embodiment shown in FIG. 1A, these crossbar support structures 105 are used to support the temporary longitudinal support structures 110a-110n (collectively referred to as 110). Even if the crossbar support structures 105 are permanent, the longitudinal support structures 110 are usually temporary, and serve to support and secure the removable floorboard panels. The longitudinal support structures 110 are typically removed prior to installation of the completed, final flooring system.

The longitudinal support structures 110 can be made from aluminum, metal, composite materials, wood, or other materials. Typically, they are long enough to support multiple floorboard panels. In one embodiment, the longitudinal support structures 110 may be 8-12 feet long, although in other embodiments they can be shorter, or longer. Although illustrated as a rectangular channel in FIG. 1A for ease of illustration, a number of cross-sectional shapes can be used. The number of longitudinal support structures 110 can vary, but typically a longitudinal support structure is provided at the edge of each floorboard panel (i.e., the edge running along the length of the fuselage), with at least one or more longitudinal support structures 110 positioned between each edge of the floorboard panel.

The longitudinal support structures 110 may comprise a number of locking disks 150 that are usually regularly spaced on the top of the longitudinal support structure 110. The locking disk 150 serves as a base to which the floorboard panel is affixed via a latch. For the longitudinal support structures 110 which support an edge of a floorboard panel, it is not required that these have locking disks. The longitudinal support structures 110 that support a panel in the middle portion of a panel (e.g., under a latch on the floorboard panel) will typically have a corresponding locking disk 150 affixed to the support structure. In one embodiment, the locking disk is affixed to the longitudinal support structure via screws, but other embodiments may utilize other fastening means, such as glue, bolts, etc. As will be seen, the locking disk 150 protrudes from the longitudinal support and mates with a latch assembly comprising the latch, cam, and board disk in the floorboard panel.

In this manner, the longitudinal support structures are placed upon the crossbar support structures 105 in a planar manner to provide a planar structure upon which the floorboard panels may be placed. An embodiment in which the floorboard panels are installed is illustrated in FIG. 1B, where a plurality of floorboard panels 120a-120n (collectively referred to as 120) are positioned over the longitudinal support structures. Each floorboard panel 120 is typically rectangular in shape, and comprises two latches 125, which mate and engage with a corresponding locking disk 150. Although this embodiment shows that two floorboard panels are sufficient to span the width of the fuselage, other embodiments may use three or more floorboard panels, or only one. As will be seen, other configurations are possible for the floorboard panels to create a temporary floor in a workspace.

Although FIG. 1B illustrates the floorboard as a rectangular panel, other embodiments may use other shapes or proportions. Typically, the floorboard panels are positioned in a contiguous manner to provide a flat and level surface, without gaps, to allow workers to walk or stand as needed. In many cases, workers may require temporary access to the space underneath a floorboard panel, so a given floorboard panel may be temporarily removed after installation allowing workers to readily access the space underneath that panel.

By engaging the latch with the locking disk, the floorboard panel is affixed to the longitudinal support structure, and resists tipping or movement when walked upon. Further, in some embodiments two latches 125 may be used to readily engage or disengage the floorboard panels to the longitudinal support structure.

Figure 2A:
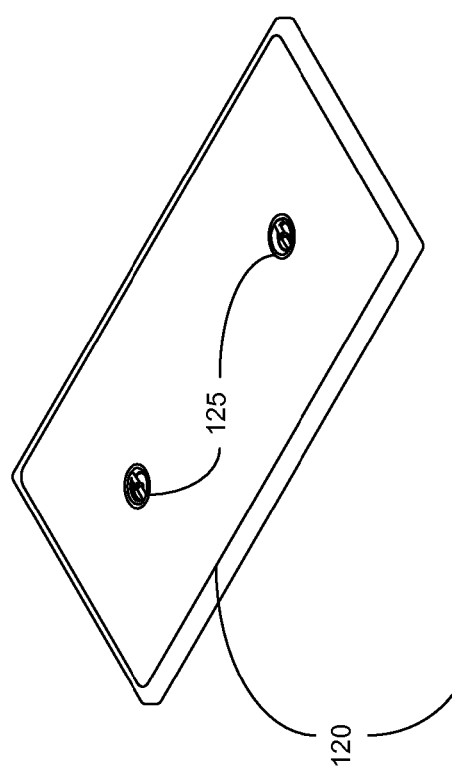
FIGS. 2A-2C illustrate various views of one embodiment of a floorboard panel.
Figure 2B:
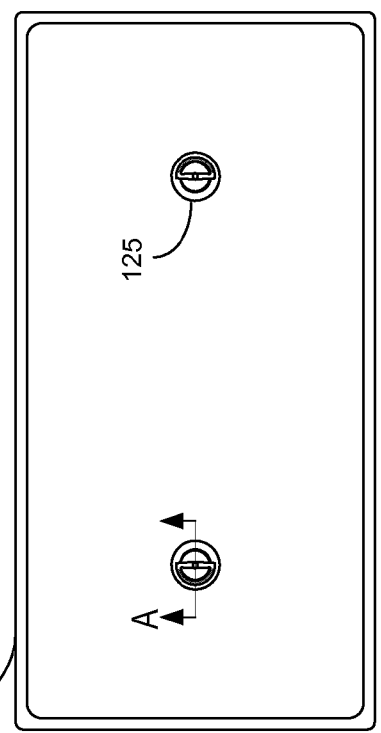
Figure 2C:
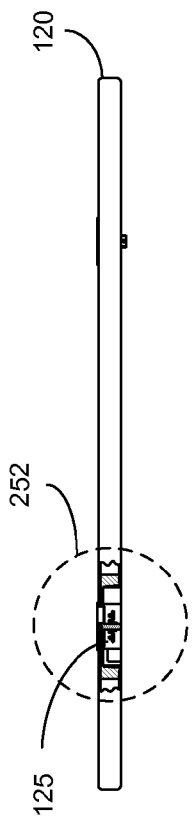

Having established one context in which the floorboard panel system may be employed, FIGS. 2A-2C illustrate several views of one embodiment of the floorboard panel 120 itself. Specifically, FIG. 2A shows a perspective view, FIG. 2B shows a plan view, and FIG. 2C shows a side view. The floorboard panel typically is rectangular in shape and the particular size and proportions may vary. In one embodiment, the length of the floorboard panel 120 is nominally twice the length of the width. In one embodiment, the floorboard panel is nominally sized to be 4 feet by 2 feet. Typically, the floorboard panels are manufactured slightly undersized so that a slight gap (e.g., 1/16"-1/8") can be accommodated between adjacent floorboard panels without affecting the overall nominal length of the combined floorboard panels. For example, placing three floorboard panels in an adjacent manner that are nominally 4 feet in length would typically result in an end-to-end distance not exceeding 12 feet (as opposed exceeding 12 feet by a fraction of an inch). In this embodiment, the edges are also slightly rounded which facilitates accommodating slightly irregular floorboard panel sizes, and temporary removal/installation of a single floorboard panel in an installed floor system. Rounded corners also help to avoid injuries during handling of the floorboard panels. The thickness of the floorboard panel can vary based on the material and construction used, and the weight bearing requirements. In one embodiment, the thickness is less than two inches, namely about 1.25 inches. The materials used should be thick enough to support the weight of the workers and equipment used, and needs to be thick enough to accommodate the components of the latch assembly.

Each floorboard panel comprises one or more latches 125. The latch is part of a latch assembly 252 shown in FIG. 2C that comprises the latch and a board disk that mates with the locking disk 150 of FIG. 1. The locking disk, in turn, is affixed to the longitudinal structural member 110 of FIG. 1A. The latch itself is mechanically affixed to the floorboard panel, so that the latch cannot fall out as floorboard panels are removed or installed. The latch assembly 252 of FIG. 2C will be shown in an enlarged cross-sectional view with respect to FIG. 4, where additional details of the latch assembly will be provided.

In one embodiment the floorboard panel can be manufactured from a one-piece plastic panel, using an injection molding process. Plastic can provide a durable material, which can offer surface resistance to oils, paints, and damage from dropped tools, etc. Further, desirable weight and electrostatic properties may be achieved, as well as resistance to warping, depending on the material chosen. A single injection molded piece also facilitates fabrication, in that the holes for the latch assembly may not have to be drilled, but can be molded into the floorboard panel. Other embodiment may use composite materials or panels, such as those known under the name of NidaCore available from Nida-Core Corporation located at 541 NW Interpark Place, St. Lucie, Fla. 34986.

In other embodiments, the floorboard panels can be made of plywood having a sufficient number of layers to minimize warping of the floorboard panel and provide the desired strength. Plywood is readily available, has a relatively low cost, and can be fabricated into a floorboard panel using conventional woodworking tools.

Another embodiment of the floorboard panel is possible by assembling the floorboard panel as a torsion box panel. This embodiment is illustrated in the exploded figure of the floorboard panel of FIG. 3. The torsion box floorboard panel comprises a lower skin 350 and an upper skin 320, between which is a frame 330. The skins, as well as the frame, may be a molded plastic or composite material. This construction typically provides for an improved weight to strength ratio relative to a single, solid panel construction. The upper skin 320 and lower skin 350 are typically adhered to the frame via an adhesive, thermo-welding, or other adhesion means. Mechanical fasteners may be further used to join the skins to the frame, or in lieu of using an adhesive. In some embodiments, additional spacer or baffles, or other types of honeycomb structures may be present between the top skin and bottom skin within the frame. This can further serve to strengthen the floorboard panel assembly.

Another component of the floorboard panel assembly is the latch assembly comprising a latch handle 310, a cam 311, and a board disk 340, which collectively mate with the locking disk 150. The locking disk 150 is fastened to the longitudinal support structure, typically with screws or bolts. The locking disk can be made from a variety of materials, and could be, e.g., a cast-metal part, a machined metal part, an injection molded plastic component, etc. The locking disk mates with the board disk 340, by fitting within a recess of the board disk. A function of the board disk is to aid in aligning and positioning of the board assembly over the corresponding locking disk. Similarly, the board disk can be made from a variety of materials, e.g., a cast metal part, a machine metal part, or an injection molded plastic component. In the case of a single molded panel, a separate board disk may not be required to be inserted into the molded panel. Rather, the corresponding shape of the board disk could be molded into the panel itself.

The locking disk also mates with the latch assembly by means of a cam 311. The cam 311 engages with the locking disk 150 to prevent movement of the floorboard. When engaged, the latch is said to be locked, and the floorboard is secured to the support structure. The use of the term "locked" means that the latch (and hence the floorboard panel) is engaged with the locking disk, and cannot be removed unless the latch is disengaged. The term "locked" in this context does not require a mechanism (such as a key and a tumbler type lock) to prevent a person from using the latch.

Because the locking disk 150 and the board disk 340 are designed to mate with each other, they come into contact each time the floorboard panel is installed and removed. Consequently, these components should be durable enough so that play does not develop over time, which can result in misalignment of the floorboards.

The lower skin is typically a composite material, about 0.25" thick, and has two holes 365 that engage with the board disk as discussed below. Each hole 365 is capable of allowing each respective locking disk 150 to be received by the board disk. The upper skin also has two corresponding holes 325, which are size to receive the latch handle 310. Typically, the upper holes 325 are smaller in size relative to the lower holes 365.

In one embodiment, the floorboard panel comprises two latch assemblies positioned on a lengthwise center line of the floorboard panel. The latch assemblies are typically positioned symmetrically about a widthwise center line of the floorboard panel. In one embodiment, the holes may be centered in the floorboard panel 11 or 12 inches from the narrow end of a floorboard panel.

Figure 4:
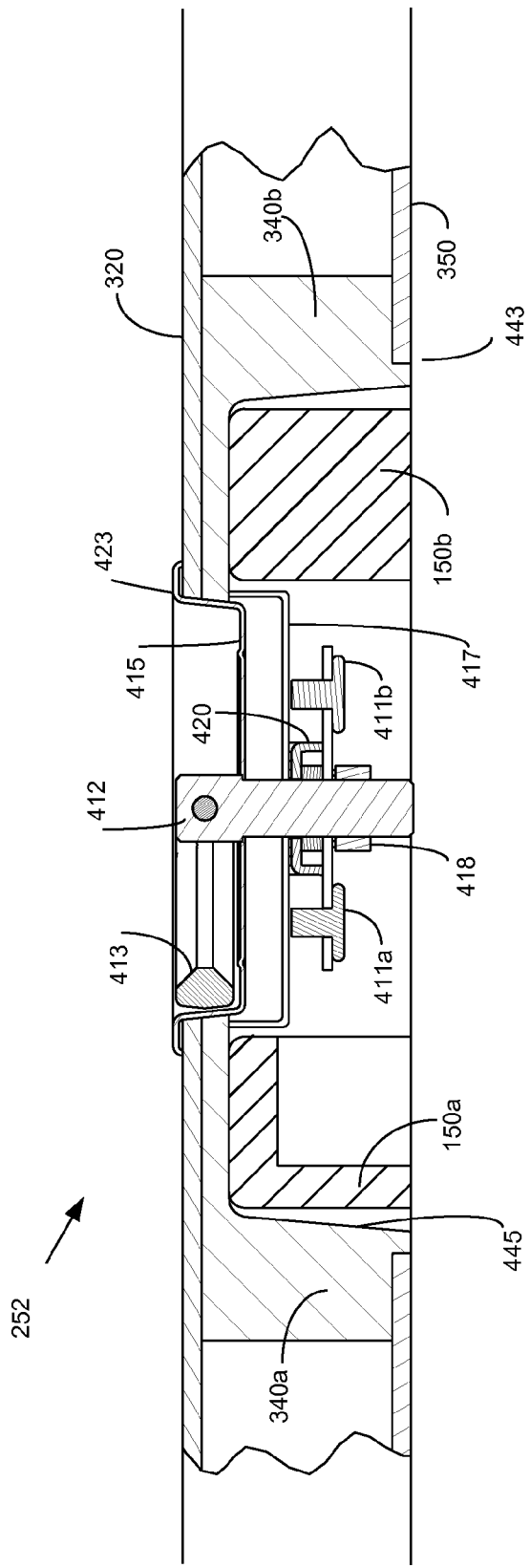
FIG. 4 illustrates a cross-sectional view of an embodiment of the latch assembly of a floorboard panel engaged with a locking disk.

FIG. 4 illustrates in greater detail a cross-sectional view of one embodiment of the latch assembly 252 from FIG. 2C. The view in FIG. 4 also includes the cross-sectional view of the board disk 340a and 340b (collectively referred to as 340), and also depicts the locking disk 150a and 150b (collectively referred to as 150) in a floorboard panel engaged with the latch assembly. FIG. 4 illustrates the top skin 320 and a bottom skin 350, in between which is positioned the board disk 340. The board disk is shaped as a disk with the top side being flat and contacting the lower side of the top skin. Thus, the top of the board disk fully contacts the lower surface of the top skin. The bottom side has a notch 443 that facilitates positioning of the board disk with respect to the hole 365 in the lower skin panel. Thus, a portion of the bottom side of the board disk is flush with the lower surface of the bottom skin, whereas another portion of the bottom side of the board disk contacts the upper surface of the bottom skin.

The board disk 340 is designed to receive the locking disk 150. To facilitate mating, the recess in the board disk 340 has a sidewall 445 that is slightly tapered. In one embodiment, the taper is 5° from perpendicular. This is shown as angle 543 in FIG. 5B. The taper facilitates positioning the floorboard panel over the locking disk, and as the floorboard then drops down over the locking disk, the two components fully mate.

Figure 5A:
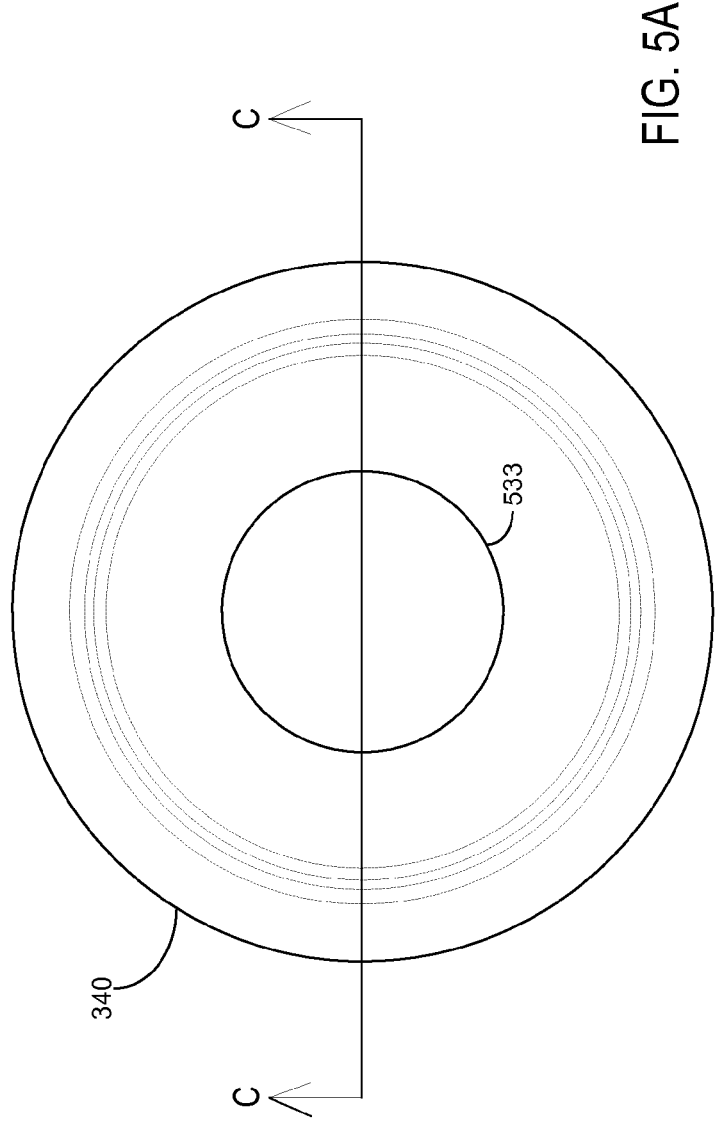
FIGS. 5A-5B illustrate one embodiment of a board disk used by the floorboard panel of FIG. 3.
Figure 5B:
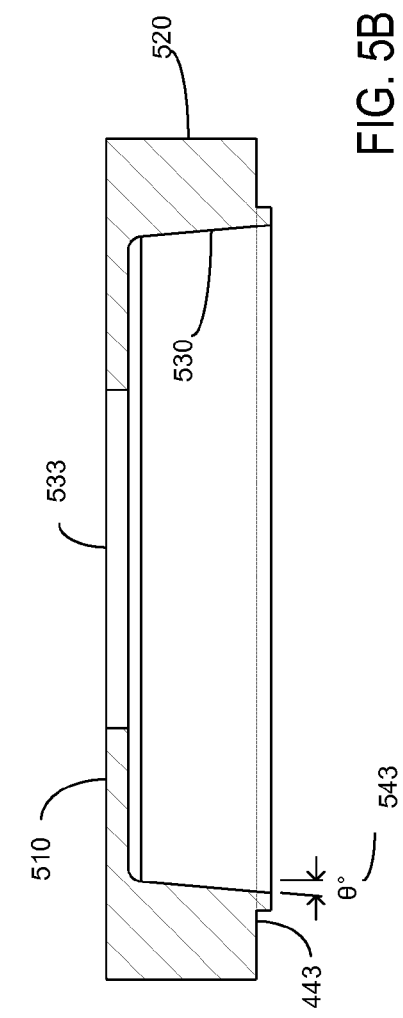

The board disk 340 is illustrated by itself in FIGS. 5A-5B. FIG. 5A is a plan view of the board disk 340, and FIG. 5B is a cross-sectional side view of line C-C in FIG. 5A. In FIG. 5A, the board disk 340 is shown with a hole 533 for receiving the latch. In one embodiment, the overall diameter of the board disk is 7" and the hole 533 is 2.8" in diameter. In FIG. 5B showing a cross-sectional view, the board disk has vertically disposed outer wall 520, and a tapered inner wall 530. In one embodiment, the board disk 340 is 1.25" high and the notch 443 is designed to receive a 0.125" thick lower skin. The diameter of the opening to receiving the locking disk can be 5.35". It should be realized that other embodiments may use other dimensions.

Returning back to FIG. 4, another component shown is the locking disk 150. The locking disk is shown in greater detail in FIGS. 6A-6B. In FIG. 6A, the locking disk 600 exhibits an outer diameter in one embodiment of 5.25" and an inner diameter of 3". A series of holes 602 allows the locking disk to be screwed or otherwise fastened to the longitudinal structural member. The perimeter of the locking disk could be described as a circle, except for portion 610 which is not present. This portion that is missing is referred to as a "cutout" for convenience reasons. Although this missing section is referred to as a "cut-out" 610, this does not imply a particular method of manufacturing the locking disk (e.g., this does not necessarily require that a portion of a locking disk is cut out). While cutting a portion may be a method of making the locking disk, it is possible for the locking disk to be cast, molded, or otherwise machined to the desired shape. The cut-out portion is designed to receive a cam associated with the latch. Because FIG. 6A is a plan view, it does not disclose that the locking has a different cross-section at different locations. The cross section at arcuate portion 620a is different from the cross section at other portions of the locking disk.

The locking disk 600 is also shown in additional detail in FIG. 6B to depict these different cross sections. FIG. 6B shows that the arcuate portion 620b has a different cross-sectional profile than the rest of the locking disk 630. Specifically, arcuate portion 620b is fashioned such that a cam can rotate 90° within the locking disk and thereby engage with the locking disk. The cross sectional profile for this portion is shown as element 150a in FIG. 4. The remaining portion depicted as arcuate portion 630 may have a cross sectional profile corresponding to element 150b in FIG. 4. Other configurations of a locking disk are possible, and those skilled in the art can envision variations based on the principles described herein.

The locking disk allows the cam portion 311 of the latch to be received in the cut-out portion 610, and allows the cam to rotate about 90° within the locking disk along the arcuate portion 620b. Once the cam is rotated past the cut-out portion, the locking disk then prevents the cam from being lifted up, e.g., moving perpendicular to the plane of the locking disk. In this manner, the latch, and hence the floorboard panel, can be secured to the locking disk, and in turn to the longitudinal support structure.

Figure 3:
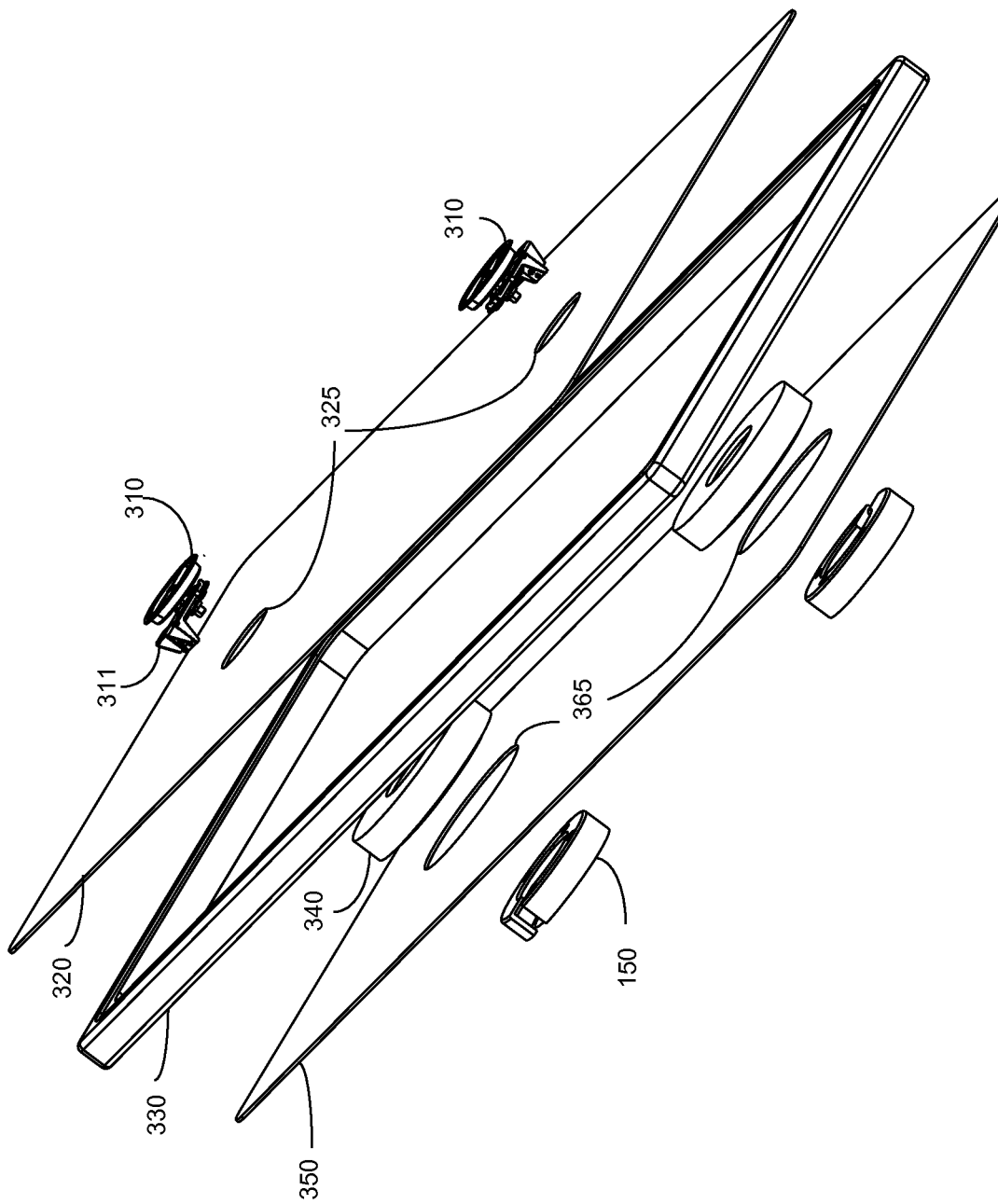
FIG. 3 illustrates an exploded diagram of one embodiment of a floorboard panel.

The latch assembly 252 of FIG. 3 is shown in greater detail in FIG. 4 and comprises several components. In FIG. 4, a shaft 412 defines an axis of rotation. The bail 413 can be lifted out and functions as a handle to rotate the cam. Rotating the shaft causes the cam 420 to rotate, and to engage with the locking disk for affixing the latch to the locking disk. Specifically, the cam is positioned in the arcuate portion 620b of FIG. 6B when engaged, and positioned in the cut-out region 610 when it is to be disengaged. Another perspective of the cam is shown as element 311 in FIG. 3.

The latch comprises a top plate 415 having a cup shape positioned in the hole of the top skin 320. The top plate forms a lip portion 423 around the hole 325, and prevents the floorboard panel from lifting up. The top plate is pressed down by the shaft 412 being pulled down, which in turn is being pulled down by the two screws 411a and 411b pushing down on collar 418. The two screws press up on lower plate 417, which presses against the upper skin at the perimeter of the upper hole, just below the lip 423. In this manner, the latch assembly is clamped to the top skin, and prevents the floorboard panel from moving separately from the latch. Other variations on this design are possible.

The latch can sometimes be referred to as a "D-ring" flush mount cam latch or lock. This is because the bail 413 can be in the shape of the letter "D", and the assembly is largely flush with the top surface. Finally, by rotating a shaft, the cam is moved, so as to latch with another fixed entity, thereby preventing upward movement of the latch. One such D-ring latch is the PERKO™ catalog number 1081/1082 series 2 latch flush mounted latch. Another latch is part #E5-91-305-UU1 from Southco. Other vendors may provide functionally comparable devices. Some vendors may distinguish between a flush mounted rotary cam lock versus a flush mounted rotary cam latch. A key lock can be provided within the assembly, to secure access to authorized users, and hence some vendors may refer to this version as a "lock" whereas a similar assembly without the key lock is referred to as a "latch." The presence of a key lock per se is not required to practice the principles of the present invention.

Figure 7:
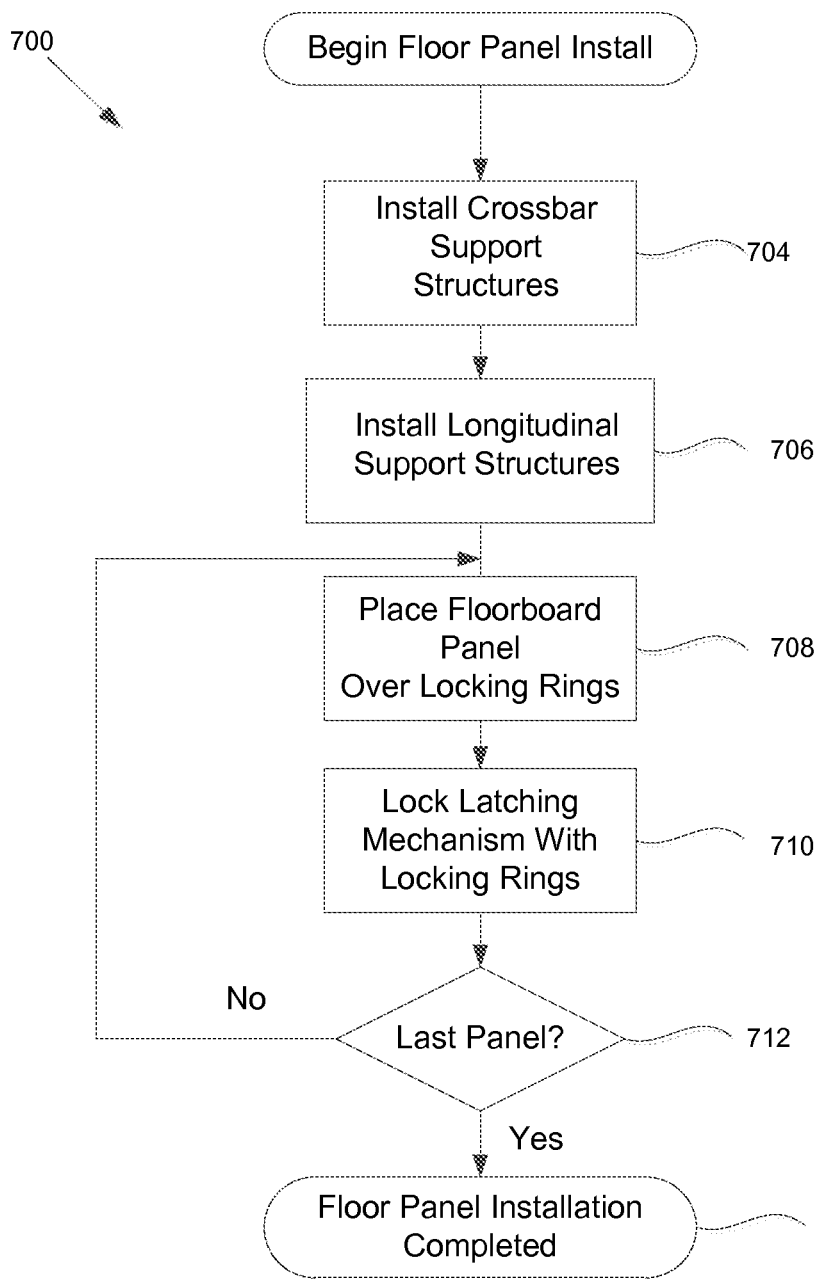
FIG. 7 illustrates one embodiment of a process flow for using the floorboard panel system.

The process for utilizing the removable floorboard panel system in a work environment is described in FIG. 7 with process 700. The process begins with step 704 in which crossbar support structures are installed. In some embodiments, the crossbar support structures may be already present. These are installed in a planar manner. Typically, at least two must be present, one to support each end of the longitudinal support structures. In some cases, additional crossbar support structures may be added.

In step 706, the longitudinal support structures 110 are installed on the crossbar support structures. If the crossbar support structures are planar, then so will be the longitudinal support structures. However, out-of-planar conditions can be tolerated to an extent. Typically, the longitudinal support structures 110 will have a series of locking disks positioned thereon. It is not required that each longitudinal support structure 110 have locking disks as the longitudinal support structure may be used at the edge of two floorboard panels, where support is needed, but not the locking disks. The presence of locking disks would prevent the floorboard panels from being stable.

In other embodiments, instead of locking disks, the longitudinal structural supports may have slots, holes, or other types of openings into which the cam can be inserted, rotated, and engage. Further, in some embodiments, longitudinal support structures 110 can used to support the edges of a floorboard and may have locking disks installed thereon, but the longitudinal support structure is positioned so that the locking disks face down, and do not contact the floorboards. In this case, the downward locking disks should not be resting on a crossbar support structure. In this manner, it is not necessary to stock different type of longitudinal support structures 110 for supporting the edge of the floorboard panel.

Once all the longitudinal support structures 110 are positioned, then a floorboard panel can be placed over the longitudinal support structure in step 710. The floorboard panel must be positioned so that the latch assemblies are positioned over the locking disks, and the floorboard panel will fall into position over the respective locking disk. Once in position, the latch assembly can be engaged in step 710 by rotating the D-ring handle. This will cause the cam to rotate and engage with the locking disk, thereby fixing the floorboard panel to the longitudinal support structure.

In step 712, a test is made to determine if this is the last floorboard panel to be installed. If not, then steps 708-710 are repeated for the remaining floorboard panels. If the test in step 712 was the last floorboard panel, then the flooring panel installation is completed as indicated in step 714.

Figure 8:
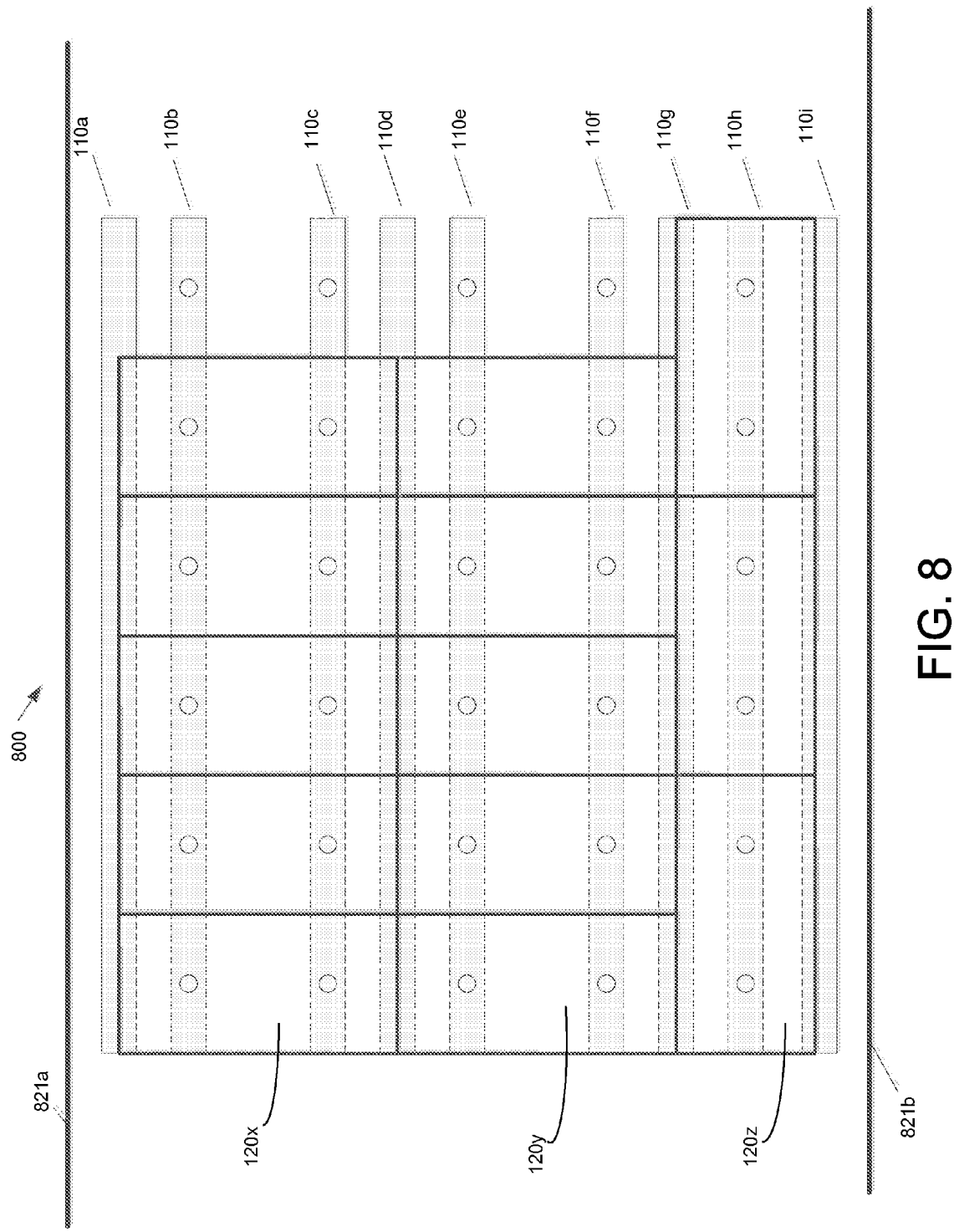
FIG. 8 illustrates one embodiment for a floorboard layout in a workspace.

FIG. 8 shows one embodiment of the longitudinal support structure and floor panel layout system 800. In this figure, the longitudinal support structures 110 are shown in gray, with the portions under the floorboard panels 120 illustrated using a dotted line. The crossbar support structures are not shown. When the longitudinal support structures 110 are in place, they should form a planar surface for receiving the floorboard panels. While some variation is tolerated, too much variation can allow the floorboard panels to rock after installed, or can prevent the latch assembly from engaging with the locking disk, which is to be avoided.

The workspace in this embodiment is bounded by lines 821a and 821b. In this embodiment, floorboard panels 120x and 120y can be positioned as shown to span a portion of the workspace, but a third floorboard panel 120z cannot be positioned in the same manner because of limited workspace. Rather, the third floorboard panel 120z is positioned in an orthogonal manner to fit within the remaining space. In one embodiment, the spacing of the latch assembly and locking disks on the longitudinal support structures 110 is such that it facilitates orienting the floorboards in either orientation.

The longitudinal support structures 110 are positioned as shown. Longitudinal support structures 110a, 110d, 110g, and 110i do not have locking disks on the surface facing the floorboard panel, because they support an edge of one or two floorboard panels. These structures can have locking disks attached, but facing down. If locking disks were present and facing up, then they would prevent the floorboard panels laying on them from lying flat.

As previously noted, the arrangement shown in FIG. 8 is not limited to aviation applications, but could represent scaffolding constructed for working in a tunnel, on a building façade, or for maintaining electrical equipment. The size of the floorboard panels can vary, as could the number of latches per floorboard panel. For example, a floorboard panel could be defined as the same area as two of the floorboard panels shown in FIG. 8 (e.g., essentially a square shape with four latch assemblies). Thus, those skilled in the art will recognize that the principles of the present invention can be applied in various ways.

The subject matter described herein is provided by way of illustration only and should not be construed as limiting. Various modifications and changes may be made to the subject matter described herein without exactly following the example embodiments and applications illustrated and described, and without departing from the true spirit and scope of the present disclosure, which is set forth in the following claims.

What is claimed is:

1. A locking floorboard panel comprising:
   a panel suitable for supporting the weight of a person, the panel comprising:
   a top skin forming the top surface of the panel,
   a bottom skin forming a bottom surface of the panel,
   a frame defining a perimeter edge of the panel, the frame having a first side joined with a perimeter edge of the top skin and a second side joined with a perimeter edge of the bottom skin, and
   a board disk positioned between the top skin and the bottom skin and configured to have a circular recess accessed through a hole in the bottom skin, wherein the circular recess is tapered to receive a locking disk attached to a longitudinal support structure; and
   a plurality of latches, wherein each latch is flush mounted with respect to a top surface of the panel, and each latch comprises a rotary operated cam lock configured to attach the floorboard panel to the longitudinal support structure.

2. The locking floorboard panel of claim 1, wherein the panel is a rectangular shaped panel having a length and a width, wherein the length is nominally twice the width.

3. The locking floorboard panel of claim 1, further comprising a baffle structure between the top skin and bottom skin.

4. The locking floorboard panel of claim 1, wherein the floorboard panel comprises a single piece injection molded plastic board.

5. The locking floorboard panel of claim 1, wherein the panel has rounded edges.

6. The locking floorboard panel of claim 2, wherein the length is nominally four feet and the width is nominally two feet.

7. The locking floorboard panel of claim 6, wherein the panel has a thickness that is less than two inches.

8. A flooring system with readily attachable flooring panels, comprising:
   a plurality of longitudinal support structures, wherein each longitudinal support structure comprises a circular locking disk affixed to the longitudinal support structure; and
   a plurality of attachable flooring panels, each flooring panel comprising:
   a rectangular shaped panel having a length and a width, wherein the length is nominally twice the width, each panel having at least two receptacles wherein each receptacle is configured to mate with the circular locking disk,
   a top skin forming a top surface of the panel,
   a bottom skin form a bottom surface of the panel,
   a frame defining a perimeter edge of the panel, the frame having a first side joined with a perimeter edge of the top skin and a second side joined with a perimeter edge of the bottom skin, and
   at least two latch assemblies, each latch assembly comprising a flush mounted rotary cam latch and a board disk and is positioned between the top skin and the bottom skin within a receptacle along the center line of the panel, wherein the center line runs parallel to the length of the panel, and wherein the board disk is configured to have a circular recess accessed through a hole in the bottom skin, the circular recess being tapered to receive the locking disk.

9. The flooring system of claim 8, wherein each flooring panel comprises a single piece injection molded plastic board.

10. The flooring system of claim of claim 8, wherein the length is nominally four feet and the width is nominally two feet.

11. The flooring system of claim 8, wherein the latch is configured to be rotated 90° to engage a cam with the locking disk.

12. The flooring system of claim of claim 11 further comprising:
   at least two cross-bar support structures for supporting the plurality of longitudinal support structures.

13. A method for providing a removable flooring system in a workspace comprising the operations of:
   providing for a plurality of longitudinal support structures in a parallel manner in the workspace, wherein each longitudinal support structure has a plurality of locking disks affixed thereto;
   placing a removable flooring panel having a length and a width, on one or more of the longitudinal support structures, wherein the removable flooring panel comprises a plurality of flush mounted rotary cam latch assemblies along a center line parallel to the length, such that each latch assembly is placed over a corresponding locking disk, wherein each latch assembly comprises a board disk positioned between a top skin and a bottom skin of the removable flooring panel, the board disk comprising a circular recess with tapered walls for receiving the locking disk; and rotating each of the plurality of flush mounted rotary cam latch assemblies to lock each the latch assembly with the locking disk.

14. The method of claim 13 further comprising:
placing a plurality of crossbar support structures in a parallel manner in a planar arrangement in the workspace prior to placing the plurality of longitudinal support structures.

15. The method of claim 13 further comprising at least one longitudinal support structure positioned such that a top surface on which the removable flooring panel is to be placed thereon does not having locking disks on the top surface, and wherein the one longitudinal support structure is positioned below an edge of the removable flooring panel.

16. A flooring system with readily attachable flooring panels, comprising:
a plurality of longitudinal support structures, wherein each longitudinal support structure comprises a circular locking disk affixed to the longitudinal support structure; and
a plurality of attachable flooring panels, each flooring panel comprising:
a rectangular shaped panel having a length and a width, wherein the length is nominally twice the width, each panel having at least two receptacles wherein each receptacle is configured to mate with the circular locking disk,
a top skin forming a top surface of the panel,
a bottom skin form a bottom surface of the panel,
a frame defining a perimeter edge of the panel, the frame having a first side joined with a perimeter edge of the top skin and a second side joined with a perimeter edge of the bottom skin, and
at least two latch assemblies, each latch assembly comprising a flush mounted rotary cam latch and a board disk and is positioned between the top skin and the bottom skin within a receptacle along the center line of the panel, wherein the center line runs parallel to the length of the panel, and wherein the board disk comprises a circular recess with tapered walls for receiving the disk lock.

* * * * *